June 22, 1965 E. K. JOHANSEN ETAL 3,190,464
ELEVATING AND TILTING MECHANISM FOR FEEDING DEVICES
Filed July 5, 1963 4 Sheets-Sheet 1

INVENTORS:
EINAR K. JOHANSEN
THOMAS W. BANNON
BY
Marzall, Johnston, Cook & Root.
ATT'YS June 22, 1965 E. K. JOHANSEN ETAL 3,190,464
ELEVATING AND TILTING MECHANISM FOR FEEDING DEVICES
Filed July 5, 1963 4 Sheets-Sheet 2

INVENTORS:
EINAR K. JOHANSEN
THOMAS W. BANNON
BY
Marzall, Johnston, Cook & Root.
ATT'YS June 22, 1965  E. K. JOHANSEN ETAL  3,190,464
ELEVATING AND TILTING MECHANISM FOR FEEDING DEVICES
Filed July 5, 1963  4 Sheets-Sheet 4
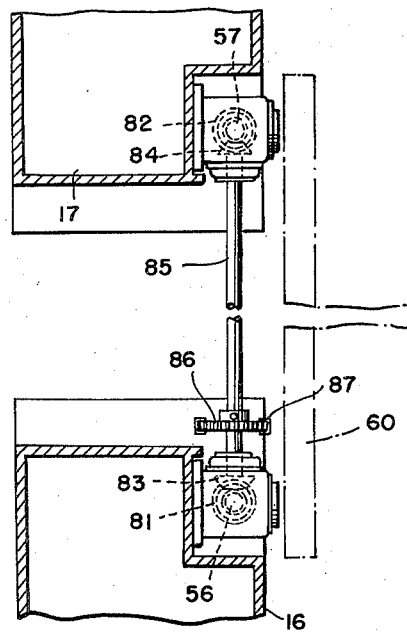
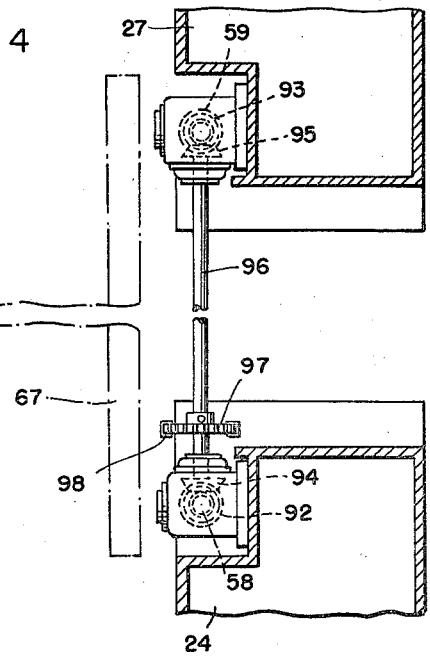
FIG. 4
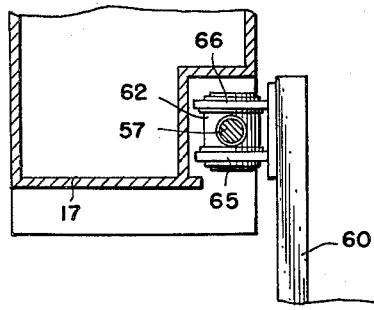
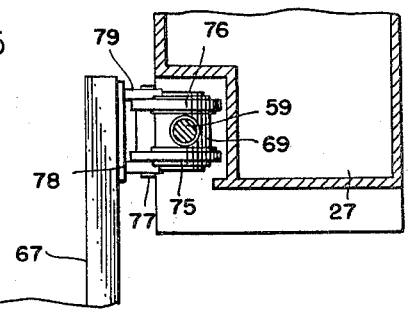
FIG. 5
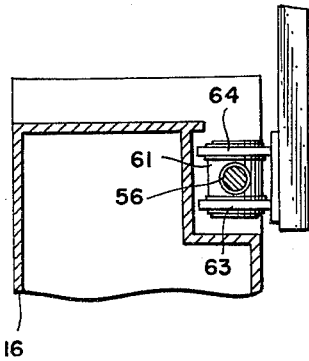
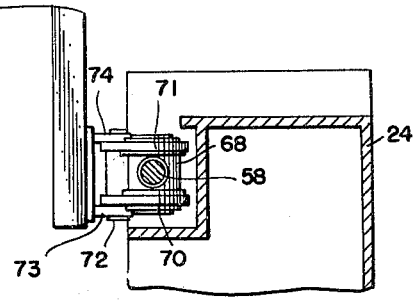
INVENTORS:
EINAR K. JOHANSEN
THOMAS W. BANNON
BY
Marzall, Johnston, Cook & Root
ATT'YS United States Patent Office 3,190,464
Patented June 22, 1965

3,190,464
ELEVATING AND TILTING MECHANISM FOR
FEEDING DEVICES
Einar K. Johansen, Oak Park, and Thomas W. Bannon,
La Grange Park, Ill., assignors to U.S. Industries, Inc.,
New York, N.Y., a corporation of Delaware
Filed July 5, 1963, Ser. No. 293,039
6 Claims. (Cl. 214—1.1)

This invention relates in general to a control mechanism for controlling the position and location of feeding devices which feed a workpiece from one station to another. More particularly the invention is directed to an elevating and tilting mechanism for use in connection with feeding devices which feed workpieces from one press to another in a line of metal working presses.

While the invention is illustrated herein in connection with a line of metal working presses, it will be evident that the invention itself can be useful in connection with other types of machines where work is performed upon a workpiece whether it be a metal workpiece, plastic, or any other material.

It is particularly useful, however, in connection with a line of machines where it becomes necessary from time to time to reach the inside of the machine for any purpose, such as for example to repair the machine, or to change or adjust dies in a press, and the like.

As stated above, the problem which the invention overcomes is particularly critical where a line of metal working presses is involved. There may be two or more presses in a line depending upon the number of operations to be performed upon a given workpiece. In the drawings three such presses have been shown but this is merely for illustrative purposes and is not intended in any way to be limiting.

In a line of presses, each of which is to perform a specific operation upon a workpiece, it has become customary to provide feeding devices between the presses which are operated to automatically remove a workpiece from a preceding press and transfer or feed it to the next succeeding press where a further operation is to be performed. These feeding devices normally are at the floor level and are aligned with the dies upon the press beds. When it becomes necessary to change or adjust dies, or to repair the press, or for any other reason it is desired to have a workman gain access to the inside of the press, it has heretofore been necessary to dismantle the feeding devices and remove them from between the presses to make room for the workman. This is a time-consuming operation and becomes extremely important if the shut-down time of the line becomes very great due to the dismantling of the feeding devices.

Another problem which has heretofore been bothersome in a line of presses relates to the fact that the workpiece, in being fed from one press to another, may have to be moved to a higher or lower level, due to the position of the die in the next succeeding press.

The mechanism for controlling the position of the feeding devices, which forms a part of the present invention, is designed to overcome the disadvantages of present constructions, as stated above, and thus the principal object of the invention is to provide such a control mechanism which will eliminate the necessity for dismantling and removing feeding devices between presses in a press line when it is necessary for any reason to reach the inside of a press.

Another object of the present invention is to provide a mechanism which may be operated to move the feeding device between adjacent presses from its normal operative position to another position out of the way where it will be rendered inoperative, which will enable a workman to gain free access to the die or other mechanism within the press.

A further object of the invention is to provide a control mechanism for feeding devices of the character herein described which will elevate the feeding device from its normal operative position to an inoperative position thereabove a sufficient distance to allow a workman to walk beneath the device and thereby gain access to the interior of the press.

Still another and more specific object of the invention is to provide a plurality of support members on which the feeding device is mounted so that the support members may be operated to elevate the feeding device upwardly to an inoperative position, thereby permitting a workman to gain free access to the interior of the press.

A still further and specific object of the invention is to provide a plurality of vertically positioned elongated screw members upon which the feeding device is mounted so that when all of the screws are caused to rotate simultaneously the feeding device mounted thereon will be elevated to an inoperative position, thereby allowing access to the interior of the press.

A still further object of the invention is to provide a novel form of mounting means by which the feeding device is supported on the screws or support members so that the members on one side of the feeding device may be operated to elevate or lower that one side without changing the elevation of the opposite side of the device, whereby when the feeding device is operated to transfer a workpiece from one press to a succeeding press, it may feed the workpiece thereto and position it in a plane either higher or lower than the plane in which the workpiece was disposed in the preceding press.

Other objects and advantages of the invention will become apparent upon reading the following description taken in conjunction with the accompanying drawings, in which:

FIG. 4 is an enlarged horizontal sectional view taken along the plane of line 4—4 of FIG. 1, and FIG. 5 is an enlarged fragmentary view similar to FIG. 2 but showing in greater detail the manner in which the feeding device is mounted upon the support members.

Briefly described, the invention contemplates the use of a plurality of support members which, as illustrated herein, comprise elongated screws. The feeding device is mounted upon these support members of which there are two at one side of one press and two at the other side of the next succeeding press. Thus, the feeding device is supported at its corners upon four support members which, as illustrated herein, are the screws. These feeding devices are normally in an operative position at the floor level where they operate in timed relation with the actuation of the presses so that they will remove a workpiece from one press where it has had an operation performed thereon, and feed it into the next press in position where a succeeding operation will be preformed thereon. When it becomes necessary to gain access to the interior of a press, then the support members or screws will be operated to elevate the feeding device out of the way to a position where a workman will have free access to the interior of the press.

The mounting means which mount the feeding device upon the support members are so constructed that one side of the feeding device may be raised or lowered by operating the support members on that side of the device, and thus allow a workpiece to be fed to the next press, to a higher or lower position than it occupied in the previous press.

Figure 1:
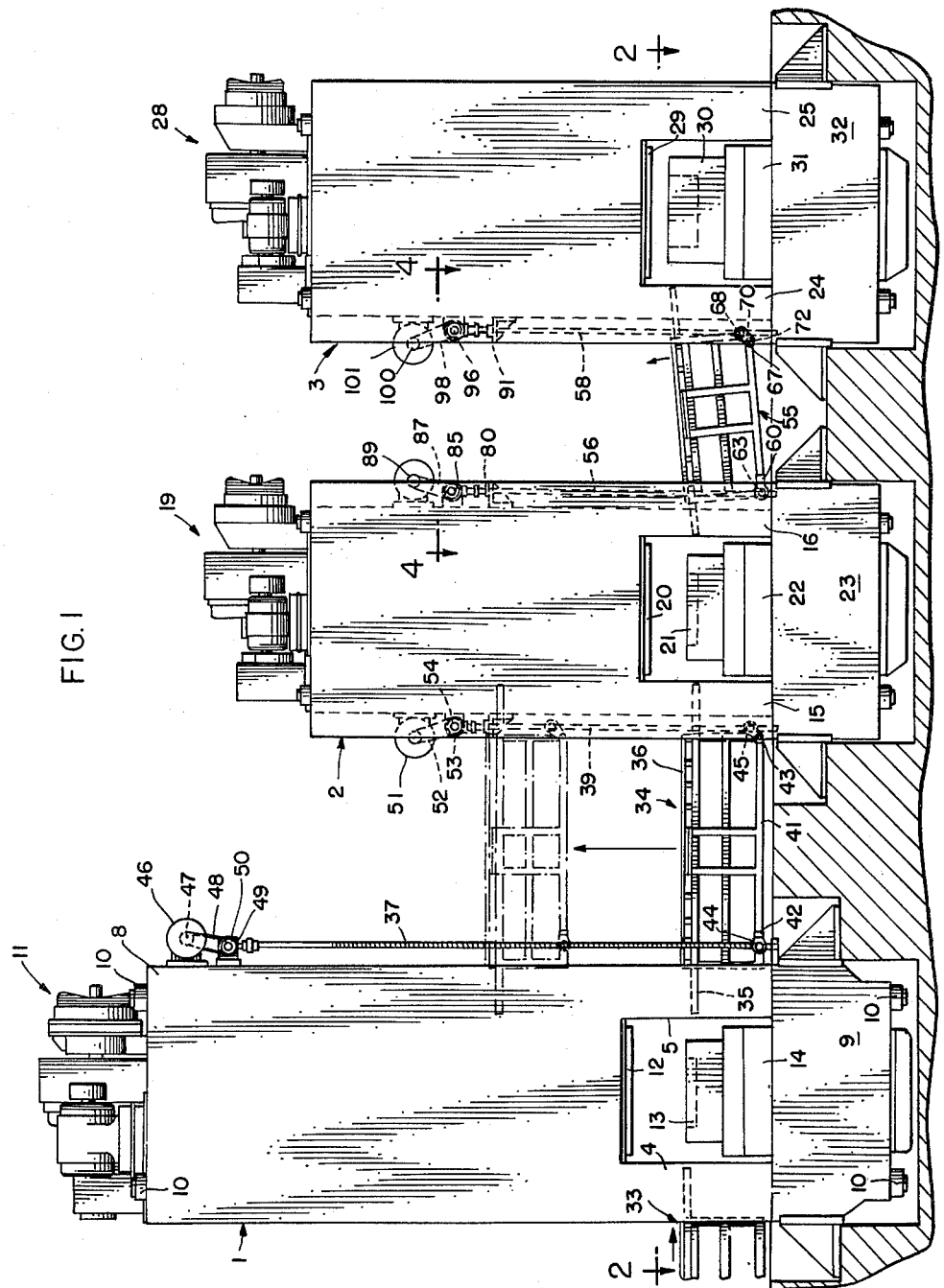
FIG. 1 is a front elevational view of three presses in a line and illustrating the present invention as applied thereto.
Figure 2:
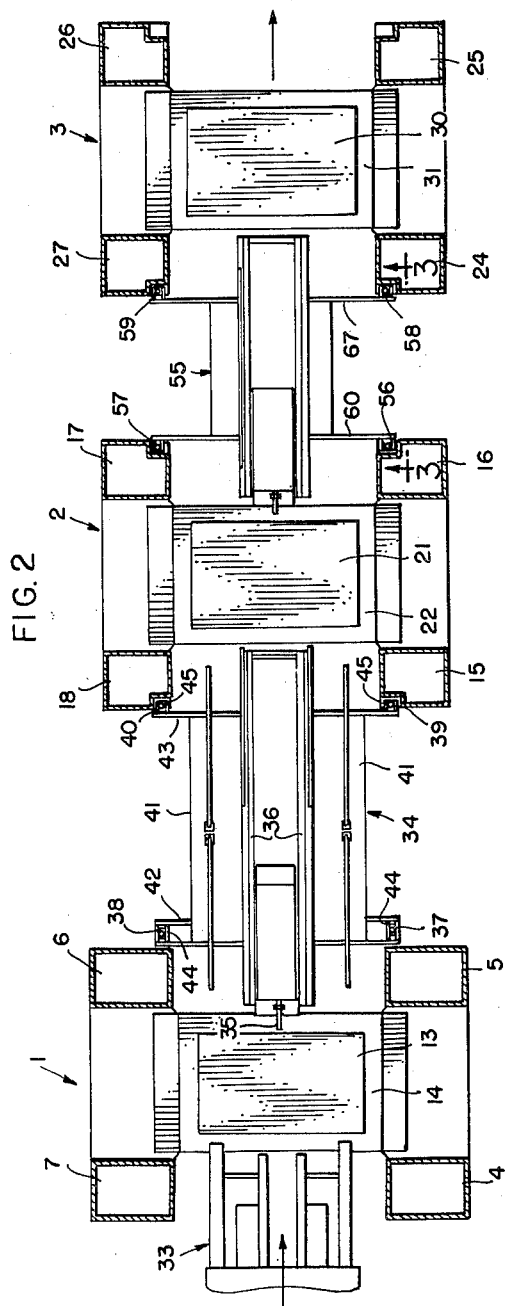
FIG. 2 is a horizontal sectional view of the line of presses with the feeding devices therebetween, and taken along the plane of line 2—2 of FIG. 1.

Referring now more particularly to the drawings, and especially to FIGS. 1 and 2, there have been shown three metal working presses in a line. These presses are indicated generally by the numerals 1, 2 and 3, respectively. As far as the present invention is concerned, it will, of course, be understood that the metal working presses shown in the drawings are for illustrative purposes only and they may be other types of machines for performing other types of operations upon workpieces.

Since the drawings do show a common or well known type of metal drawing press, it may be noted that press 1 is a double action press, while presses 2 and 3 are shown to be single action presses. Press 1 is provided with uprights at the front and rear thereof which have the downwardly extending leg portions 4, 5, 6, and 7 (FIG. 2). The press is provided with a crown 8 at the top thereof and a bed 9 at the bottom held rigidly together by tie rods 10. Suitable drive mechanism indicated generally at 11 is utilized to actuate a mechanism within the press frame which will reciprocate the draw slide 12 which will have a suitable die affixed thereto to cooperate with the lower die 13 on the bolster 14.

The next press in the line, being a single action press, is somewhat smaller but still is formed of the uprights having legs 15, 16, 17, and 18. This press likewise has suitable drive mechanism 19 at the top thereof connected to a crank or eccentric within the press frame which will reciprocate the draw slide 20, which in turn may have a suitable die thereon to cooperate with the lower die 21 on the bolster 22 in performing a second operation on the workpiece. The bolster 22 rests upon the bed of the press 23 in the usual and well known manner.

Press 3 is likewise provided with the side uprights and legs 24, 25, 26, and 27. A source of power 28 at the top of the press will actuate a mechanism within the press frame to reciprocate the draw slide or punch 29 on which there may be an upper die to cooperate with a lower die 30 on the bolster 31 supported by the press bed 32.

In actual practice there may be several more than the three presses shown herein, but for purposes of illustrating the present invention and the manner of its operation, it is sufficient to show the three presses in a line.

In the operation of the press line, a blank workpiece will be fed into the first press in the line and positioned upon the lower die 13 therein at which time the first press is caused to be actuated for an operation to be performed upon the workpiece. Mechanism is then actuated to extract the workpiece from the die in the first press and to transfer or feed the workpiece from the first press to the second press where again it will be positioned upon the die 21 so that a further operation may be performed thereon by the die of the second press.

Similar mechanism or feeding device may be disposed between the second and third presses which will operate to transfer or feed the workpiece from the second press, after it has been operated upon thereby, to the die of the third press so that a still further operation may be performed thereon.

The workpiece blank may be supported by an suitable means, such as a supporting platform generally indicated by the numeral 33. The feeding device between press 1 and press 2 is indicated generally by the numeral 34. The specific construction of this feeding device does not form a part of the present invention and, therefore, it will not be described in detail. It is, however, the subject matter of a copending application in the name of Thomas W. Bannon, Serial No. 292,962 filed July 5, 1963.

It is sufficient for present purposes to state that after the workpiece has been operated upon by press 1, a clamp member 35 will be caused to grasp the workpiece and to move it along tracks 36 toward the second station or press 2. The workpiece may be delivered directly to the second press or it may be delivered to an intermediate station for a period of dwell before it reaches the second press. That again, however, is of no concern here.

The feeding device 34 is mounted upon the vertically extending support members 37, 38, 39, and 40. The members 37 and 38 are disposed at one side of press 1 and adjacent one side of the feeding device 34. The other support members 39 and 40 are disposed at the opposite side of the feeding device 34 and at the adjacent side of press 2, as shown in FIGS. 2, 4 and 5.

The support members 37, 38, 39, and 40 are so arranged that they may be caused to operate in a manner which will raise or lower the feeding device 34. For purposes of illustration herein, these support members are indicated as being vertically disposed elongated screws as more clearly shown in detail in FIG. 3.

The feeding device 34 is provided with a framework which includes the members 41 at the front and rear thereof which in turn are secured to the transversely extending bars 42 and 43. Suitable bearing members 44 are connected at the front and rear ends of the supporting bar 42 and are internally threaded to engage the threads on the vertical screws or support members 37 and 38.

At the opposite side of the feeding device adjacent the press 2 a similar mounting means is provided for the feeding device, the details of which will be described hereinafter. For the present it is sufficient to mention that these mounting means are indicated at 45 and are connected to the front and rear ends of the supporting crossbar 43. Again, these mounting members 45 are internally threaded to engage the threads on the respective screws 39 and 40.

Suitable drive means are provided to operate the support members or screws 37, 38, 39, and 40 so as to elevate the feeding device 34 to the dot-dash line position thereof shown in FIG. 1. It will be evident that there may be numerous forms of operating devices which may be used to rotate the screws. There could be one motor, for example, to drive all four screws, or there could be two motors to drive two screws simultaneously, or there could be one drive means for each of the four screws. For purposes of illustration there has been shown herein a single motor or drive means for each pair of screws. For example, the screws 37 and 38 may be caused to rotate by means of a motor 46 having a shaft 47 and chain 48 around a sprocket 49 on a cross shaft 50. By suitable bevel gears the motor 46 will cause a rotation of the cross-shaft 50 and a consequent rotation of the screws 37 and 38.

A similar arrangement is utilized to operate screws 39 and 40. For example, a motor 51 may drive a chain 52 which passes around a sprocket 53 on a shaft 54 which may have suitable bevel gears at each end thereof to rotate the screws 39 and 40. When these motors 46 and 51 are operated simultaneously, all four screws will rotate and will elevate the feeding device 34 upwardly a predetermined distance sufficient for a workman to walk below it and thus have free access to the interior of the presses 1 and 2. As stated above, this access may be desired for possible repair or die changing within the frame of the press.

As also stated hereinabove, another feature of the invention is the arrangement which allows for one side only of the feeding device to be raised or lowered to compensate for a die position in a succeeding press which may be above or below the level of the die in the preceding press from which the workpiece has just been removed. This feature is illustrated in FIGS. 1 and 3 where the feeding device generally indicated by the number 55 between presses 2 and 3 is shown in a tilted position.

The details of the feeding device are not important with respect to the present invention except insofar as its mounting on the screws is concerned. The feeding device 55 may, if desired, be identical in structure with feeding device 34, or it may be different to effect a different type of transfer. The manner in which feeding device 55 is mounted on its support members is preferably the same as the mounting means for the feeding device 34. In this case, however, since the device 55 is shown in tilted position, the construction of the mounting means will be described in greater detail.

The support members for feeding device 55 are likewise shown herein as being elongated screws and the two at one side of the device are indicated by the numerals 56 and 57 while the two members or screws at the opposite side of the feeding device are indicated by the numerals 58 and 59.

Figure 3:
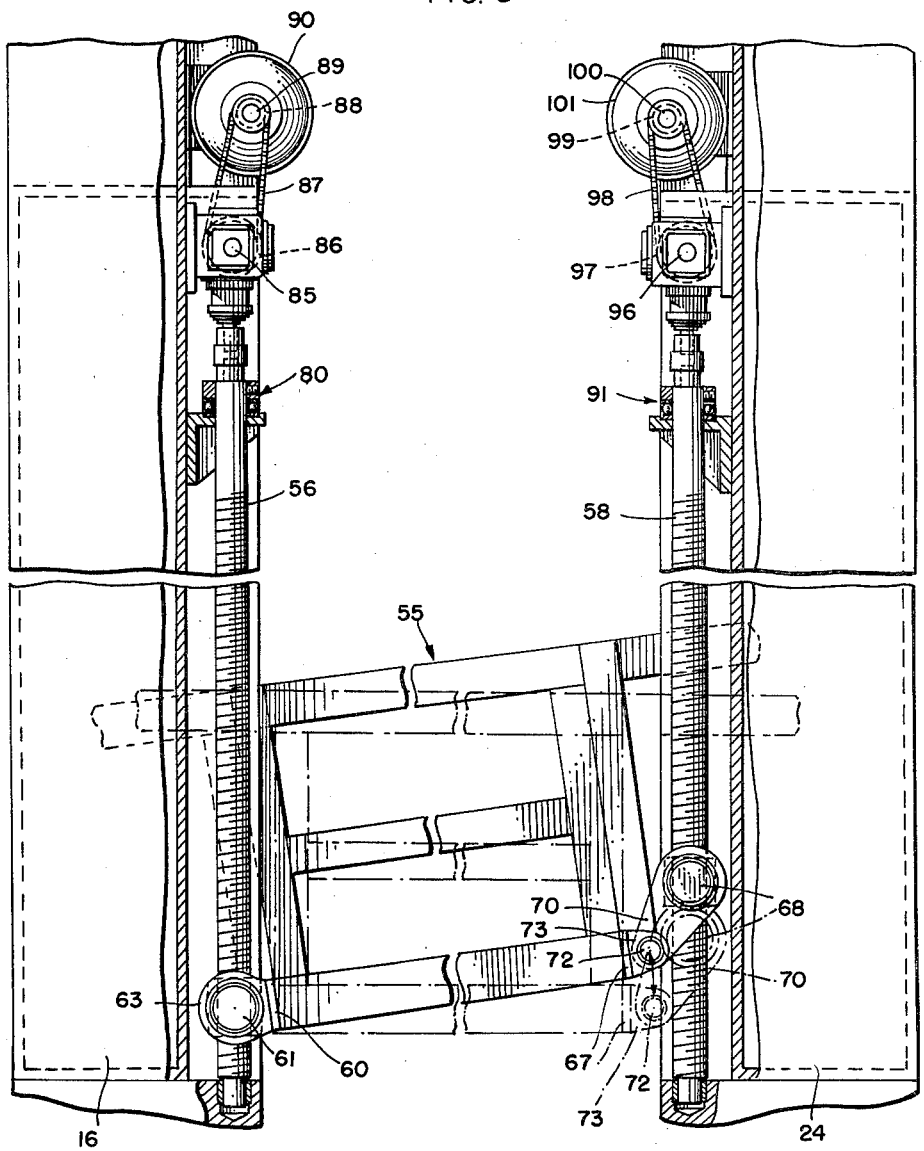
FIG. 3 is an enlarged sectional view taken substantially along the plane of line 3—3 of FIG. 2 illustrating in greater detail the manner of mounting the feeding device on the support members.

One side of the frame of the feeding device 55 is provided with the cross supporting bar 60 at the ends of which there are bearings 61 and 62 (FIGS. 3 and 5). Links 63 and 64 are positioned at opposite sides of the bearing 61 and are mounted thereon for rotation with respect thereto. The outer ends of these links 63 and 64 are secured to the cross supporting bar 60.

Likewise, similar links 65 and 66 are provided at opposite ends of the bearing 62 and are secured at their outer ends also the cross supporting bar 60 and are mounted to rotate with respect to the bearing 62.

At the opposite side of the feeding device a slightly different arrangement has been devised which will allow the feeding device to be tilted. Again referring to FIGS. 3 and 5, it will be seen that a similar cross supporting bar 67 extends from front to rear of the feeding device 55. A bearing member 68 is internally threaded to engage the threads of screw 58 while a similar bearing 69 is also internally threaded to engage the threads on the screw 59. Links 70 and 71 are mounted for rotation on the bearing 68 and are pivotally connected at their outer or lower ends by means of a pivot pin 72 to the bracket members 73 and 74 fixed to one end of the crossbar 67. At the rear of the press a similar pair of links 75 and 76 are mounted on the bearing 69 for rotation with respect thereto. The outer or lower ends of these links are pivotally mounted by means of a pivot pin 77 to the bracket members 78 and 79 rigidly secured to the opposite end of the crossbar 67.

Since the support members herein are all specifically designated as screws, it will be clear that the bearings 61, 62, 68, and 69 are all internally threaded to enage the threads of their respective screws. Rotation of the screws will cause the bearings, and any part of the structure connected thereto, to be raised or lowered, depending upon the direction of rotation of the screws.

The drive means for rotating the screws are similar to and may be identical with the drive means heretofore described generally with respect to the screws 37, 38, 39, and 40. The screws 56 and 57 at one side of the feeding device 55 extend upwardly and are supported adjacent their upper ends in suitable bearing members 80. Above this point the screws have mounted thereon bevel gears 81 and 82 (FIG. 4). These gears mesh with similar bevel gears 83 and 84 at opposite ends of the cross shaft 85 which has at a suitable place along the length thereof a sprocket 86 secured thereto. A chain 87 passes around the sprocket 86 and engages a sprocket 88 on the drive shaft 89 of a motor 90 (FIG. 3). Thus, motor 90 will rotate the cross shaft 85 and through the medium of the bevel gears at each end thereof will rotate simultaneously the screws 56 and 57.

A similar arrangement is provided at the opposite side of the feeding device 55 where it will be seen that the upper ends of screws 58 and 59 are mounted in suitable bearings 91. The upper ends of the screws 58 and 59 have secured thereto the bevel gears 92 and 93 in mesh with bevel gears 94 and 95 mounted on opposite ends of the cross shaft 96. A sprocket 97 on the shaft 96 is driven by a chain 98 passing around another sprocket 99 on the shaft 100 of the motor 101. Again, it will be evident that the motor 101 by driving the shaft 96 will cause the screws 58 and 59 to rotate and raise or lower the bearings 68 and 69 connected therewith, depending upon the direction of rotation of the screws.

Motors 90 and 101, if desired, may be caused to rotate simultaneously, in which event the feeding device 55 will be bodily elevated a predetermined distance such that a workman can have access to the interior of the presses 2 and 3. On the other hand, if it is desired to tilt the feeding device 55, then either the screws 56 and 57 may be rotated while the others remain stationary, or the screws 58 and 59 may be rotated while the other two remain stationary.

FIG. 1 shows the feeding device 55 in its tilted position. FIG. 3 shows the same feeding device in its tilted position in full lines and in its normal or horizontal position in dot-dash lines. When moved from the dot-dash line position to the full line position, only motor 101 will be operated to rotate the screws 58 and 59, whereupon the bearings 68 and 69 and that side of the feeding device 55 connected thereto will be raised.

It will, of course, be evident that when one side only of the feeding device is raised or lowered, the distance between the connections to the respective screws at opposite sides thereof will be increased. It is thus the arrangement of the links 70, 71 and 75, 76 which compensates for this increased distance and allows for a considerable up-and-down movement of either side of the feeding device 55. If it is desired to feed from a higher level to a lower level, then the screws 56 and 57 can be operated to elevate the left side of the feeding device as viewed in FIGS. 1 and 3 instead of operating the screws at the opposite side thereof.

The feeding device 34 in the illustrated embodiment of the invention is also mounted in the same way as just described with respect to the feeding device 55. Thus, either side of feeding device 34 may be raised or lowered. If it should be desired that no tilting be provided for, then of course the links, such as 70, 71 and 75, 76, could be eliminated and the connections at that side of the feeding device could be the same as that illustrated by the connecting links 63, 64 and 65, 66.

It will thus be evident that the present invention provides definite advantages over press lines of the past or any line of machines where a plurality of operations are to be performed upon a workpiece. The ability to elevate the feeding devices between adjacent presses to enable a workman to gain access to the interior of the presses is a distinct advantage from the standpoint of saving press shut-down time, because it is no longer necessary to completely dismantle and remove the feeding devices. Also, the ability of the present invention to be utilized for feeding the workpiece to or from a higher or lower level in a succeeding press obviates the necessity for providing more accurate positioning of the die. With the present invention, either side of the feeding devices may be adjusted upwardly or downwardly to compensate for the differences in die levels as between adjacent presses.

Changes may be made in the form and construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. Control mechanism for a feeding device adapted to feed a workpiece from a first machine, in which an operation is performed thereon, to a second machine comprising, (a) a plurality of vertically extending support members mounted on each of said machines, (b) means mounting said device on said support members, including a linkage connection between said device and the support members on only one of said machines, and (c) means to operate said support members to elevate said device a predetermined distance sufficient to allow access to the interior of the machines between which said device is located, and to tilt said device when desired.

2. Control mechanism for a feeding device as defined in claim 1, wherein said vertically extending support members are screws.

3. Control mechanism for a feeding device adapted to feed a workpiece from a first metal working press to a second metal working press comprising, (a) a plurality of vertically extending elongated screws mounted on the side of the first press adjacent the feeding device, (b) a plurality of vertically extending elongated screws mounted on the side of the second press adjacent the feeding device, (c) means at each side of the feeding device for mounting said device on said screws in threaded engagement therewith, and (d) means for rotating said screws simultaneously at the same rate of speed, whereby said feeding device may be raised and lowered between the presses.

4. Control mechanism for a feeding device as defined in claim 3, wherein said means at each side of the feeding device for mounting said device on said screws includes internally threaded bearing members threadedly engaging said screws, means pivotally connecting the device directly to said bearing members at one side of said device, and linkage means connecting the device to said bearing members at the other side thereof.

5. Elevating and tilting mechanism for a feeding device adapted to feed a workpiece from one metal working machine to a second metal working machine comprising, (a) a plurality of support members, at least two of which are located at one side of said device adjacent one machine, and at least two of which are located at the other side of said device adjacent the other machine, (b) means mounting said device on said support members including (1) a linkage connection between said device and the support members at one side only thereof, and (2) a pivot connection between said device and the support members at the other side thereof, and (c) means to operate said support members for (1) elevating said device through a distance sufficient for a person to walk thereunder and thus have access to the machines at either side thereof, and (2) for elevating one side of said device through a distance greater than the other side thereof, whereby tilting of the device will occur.

6. Elevating and tilting mechanism for a feeding device as defined in claim 5, wherein said support members are elongated screws.

References Cited by the Examiner

UNITED STATES PATENTS

| | | | |
|---|---|---|---|
| 1,519,357 | 12/24 | Campbell | 187—8.59 X |
| 2,856,079 | 10/58 | Watter. | |
| 3,001,651 | 9/61 | Fekete. | |
| 3,029,957 | 4/62 | Freeman. | |

HUGO O. SCHULZ, *Primary Examiner.*